(12) United States Patent
Martin et al.

(10) Patent No.: US 9,247,389 B2
(45) Date of Patent: Jan. 26, 2016

(54) SYSTEMS, METHODS, DEVICES AND ARRANGEMENTS FOR EMERGENCY CALL SERVICES

(71) Applicant: 8x8, Inc., San Jose, CA (US)

(72) Inventors: Bryan Martin, San Jose, CA (US); Garth Judge, San Jose, CA (US)

(73) Assignee: 8x8, Inc., San Jose, CA (US)

( * ) Notice: Subject to any disclaimer, the term of this patent is extended or adjusted under 35 U.S.C. 154(b) by 87 days.

(21) Appl. No.: 14/269,321

(22) Filed: May 5, 2014

(65) Prior Publication Data

US 2014/0241334 A1    Aug. 28, 2014

Related U.S. Application Data

(63) Continuation of application No. 12/793,343, filed on Jun. 3, 2010, now Pat. No. 8,879,540.

(51) Int. Cl.
*H04W 4/02* (2009.01)
*H04L 12/66* (2006.01)
*H04W 4/22* (2009.01)

(52) U.S. Cl.
CPC ............... *H04W 4/023* (2013.01); *H04W 4/22* (2013.01)

(58) Field of Classification Search
CPC .... H04W 64/00; H04W 4/02; H04L 63/0492; H04L 1/72577; G06F 2221/2111
USPC .................. 455/456.1, 404.2, 414.2
See application file for complete search history.

(56) References Cited

U.S. PATENT DOCUMENTS

| | | |
|---|---|---|
| 6,064,722 A | 5/2000 | Clise et al. |
| 6,397,054 B1 | 5/2002 | Hoirup et al. |
| 7,177,397 B2 | 2/2007 | McCalmont et al. |
| 7,308,246 B2 | 12/2007 | Yamazaki et al. |
| 7,558,852 B2 | 7/2009 | Douglas et al. |
| 7,788,188 B2 | 8/2010 | Kramer |
| 7,826,598 B1 | 11/2010 | Prozeniuk et al. |
| 7,826,599 B2 | 11/2010 | Goldman et al. |
| 8,041,331 B2 | 10/2011 | Sokondar |
| 8,045,954 B2 | 10/2011 | Barbeau et al. |
| 8,135,413 B2 | 3/2012 | Dupray |
| 8,422,986 B1 | 4/2013 | Martin et al. |
| 2004/0198386 A1 | 10/2004 | Dupray |
| 2005/0083911 A1* | 4/2005 | Grabelsky ............ H04Q 3/0025 370/352 |
| 2005/0208952 A1* | 9/2005 | Dietrich ................ G01S 5/0221 455/456.1 |
| 2005/0222933 A1 | 10/2005 | Wesby |
| 2006/0062175 A1 | 3/2006 | Ling et al. |
| 2006/0146740 A1 | 7/2006 | Sheynman et al. |

(Continued)

OTHER PUBLICATIONS

"Next Generation 9-1-1:Responding to anUrgent Need for Change Initial Findings and Recommendations of NENA's NG E9-1-1 Program," National Emergency Number Association, Feb. 2006.

(Continued)

*Primary Examiner* — Asad Nawaz
*Assistant Examiner* — Jason Harley
(74) *Attorney, Agent, or Firm* — Crawford Maunu PLLC

(57) ABSTRACT

A variety of methods, systems, devices and arrangements are implemented for emergency call centers. According to one such method, a location database is populated from a plurality of endpoint devices. The location database determines locations for nodes in a data transmission route from information received from the endpoint devices. Emergency calls using these nodes are located using the populated database.

14 Claims, 8 Drawing Sheets

(56) References Cited

U.S. PATENT DOCUMENTS

| | | |
|---|---|---|
| 2006/0239205 A1 | 10/2006 | Warren et al. |
| 2006/0245406 A1 | 11/2006 | Shim |
| 2006/0277187 A1 | 12/2006 | Roese et al. |
| 2006/0293024 A1 | 12/2006 | Benco et al. |
| 2007/0053306 A1 | 3/2007 | Stevens |
| 2007/0103317 A1 | 5/2007 | Zellner et al. |
| 2007/0111702 A1 | 5/2007 | Sanzelius et al. |
| 2007/0139182 A1 | 6/2007 | O'Connor et al. |
| 2007/0149214 A1 | 6/2007 | Walsh et al. |
| 2007/0161383 A1* | 7/2007 | Caci ........ G01C 21/20 455/457 |
| 2007/0213071 A1 | 9/2007 | Hwang |
| 2007/0258449 A1 | 11/2007 | Bennett |
| 2008/0114538 A1 | 5/2008 | Lindroos |
| 2008/0155094 A1 | 6/2008 | Roese et al. |
| 2008/0194226 A1 | 8/2008 | Rivas et al. |
| 2008/0248813 A1* | 10/2008 | Chatterjee ........ G01S 1/68 455/456.2 |
| 2009/0008234 A1 | 1/2009 | Tolbert et al. |
| 2009/0024759 A1 | 1/2009 | McKibben et al. |
| 2009/0138353 A1 | 5/2009 | Mendelson |
| 2009/0191842 A1 | 7/2009 | Piett et al. |
| 2009/0207978 A1 | 8/2009 | Oldham et al. |
| 2009/0227225 A1 | 9/2009 | Mitchell, Jr. et al. |
| 2009/0281850 A1 | 11/2009 | Bruce et al. |
| 2009/0286504 A1 | 11/2009 | Krasner et al. |
| 2009/0316577 A1 | 12/2009 | Carpio et al. |
| 2010/0003953 A1 | 1/2010 | Ray et al. |
| 2010/0003954 A1 | 1/2010 | Greene et al. |
| 2010/0027773 A1 | 2/2010 | Wallis et al. |
| 2010/0093307 A1 | 4/2010 | Hui et al. |
| 2010/0150117 A1 | 6/2010 | Aweya et al. |
| 2010/0260150 A1 | 10/2010 | Aryan et al. |
| 2010/0261448 A1 | 10/2010 | Peters |
| 2010/0273445 A1 | 10/2010 | Dunn et al. |
| 2011/0009086 A1 | 1/2011 | Poremba et al. |
| 2011/0018736 A1 | 1/2011 | Carr |
| 2011/0026452 A1 | 2/2011 | Kang et al. |
| 2011/0133989 A1 | 6/2011 | Suen et al. |
| 2011/0143781 A1 | 6/2011 | Gehlen et al. |
| 2011/0189971 A1 | 8/2011 | Faccin et al. |
| 2011/0201299 A1 | 8/2011 | Kamdar |
| 2011/0238292 A1 | 9/2011 | Bresnahan et al. |
| 2012/0023178 A1 | 1/2012 | Drevon et al. |
| 2012/0058775 A1 | 3/2012 | Dupray et al. |
| 2012/0214437 A1 | 8/2012 | Ray et al. |

OTHER PUBLICATIONS

Focus Group 1C Analysis of Effectiveness of Best Practices Aimed at E911 and Public Safety Report #1, NRIC VII, Sep. 23, 2004.

TMCnet.com, Technology Marketing Corporation, Internet Telephony, Executive Suite, 8X8's Bryan Martin, vol. 10, No. 9, p. 1-6, Sep. 2007.

E911 Service | 8x8, Inc., Copyright 2009-2011 8x8, Inc. Sitemap.

Foursquare <http://web.archive.org/web/20091018042346/http://foursquare.com/learn_more>, archived by the WaybackMachine Oct. 18, 2009.

Help by Foursquare <http://web.archive.org/web/20091120180746/http://foursquare.com/help/>, archived by the WaybackMachine Nov. 20, 2009.

* cited by examiner

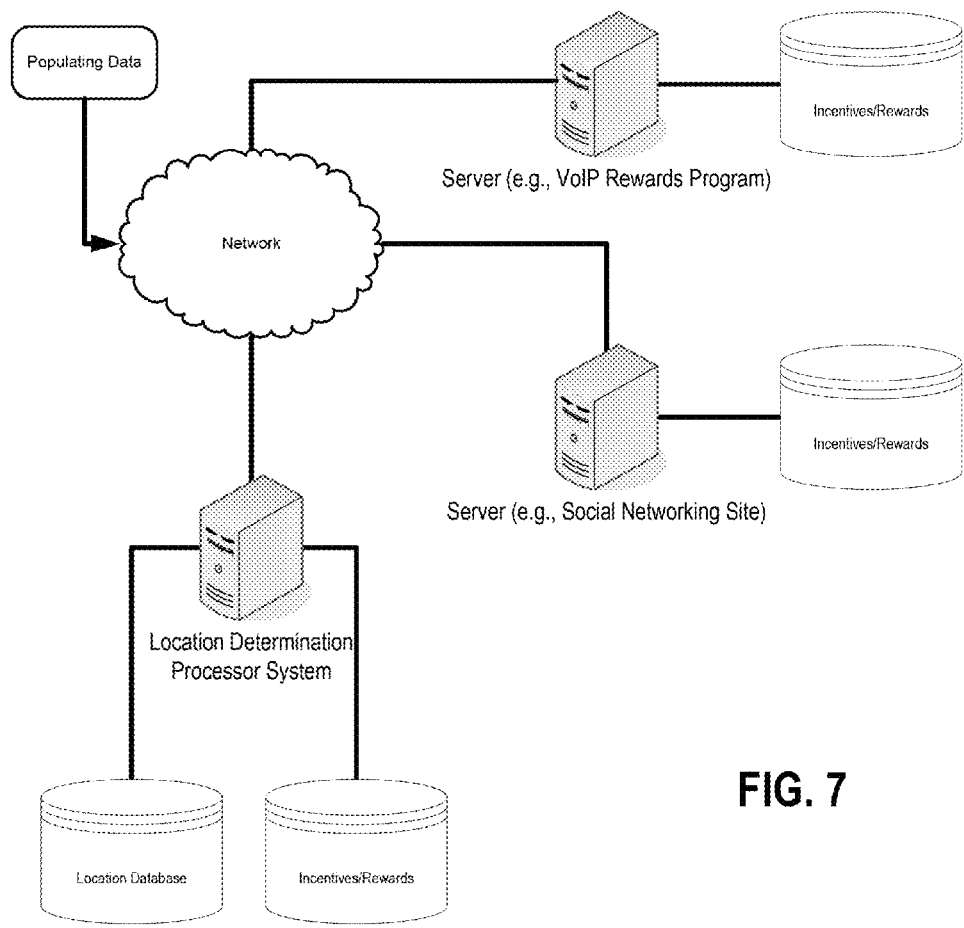
FIG. 7
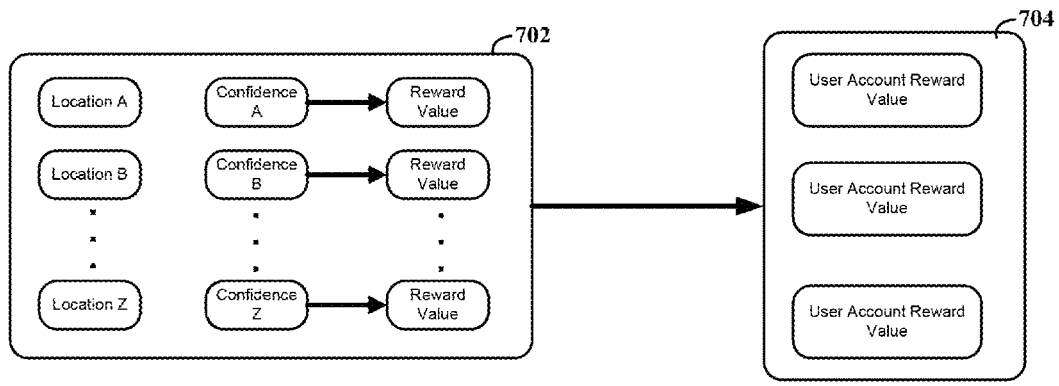

SYSTEMS, METHODS, DEVICES AND ARRANGEMENTS FOR EMERGENCY CALL SERVICES

FIELD OF THE INVENTION

The present invention relates generally to emergency call services and to systems, methods and devices for use with emergency call centers.

BACKGROUND

Emergency call centers are currently implemented using Public Safety Answering Point (PSAP) call centers. The PSAP call centers are traditionally assigned to handle calls from specific geographically-defined areas. Incoming calls are automatically routed according to an association with the location of the calling telephone number via its registered telephone number. Specifically, the calls are routed to the appropriate PSAP for that address. The caller's address and information can then be provided to the PSAP operator automatically.

In a specific implementation, Automatic Number Identification (ANI) data is provided by the telephone company. This ANI data identifies the number of the calling party, such as used with caller-ID functionality. Using the ANI data, a physical location for the caller is determined by accessing a database having associations between telephone numbers and physical locations. The call is then routed to a specific PSAP for handling by an operator.

This model works relatively well for traditional land-line telephones because telephone numbers for traditional telephones are associated with a physical line that is controlled and defined by a telephone service provider. Thus, the associations between telephone numbers and the phone's physical location are relatively static and easy to maintain.

The traditional telephone lines are rapidly being supplemented and displaced by a variety of new technologies. Many of these technologies provide a caller with new mobility options not available with a traditional land-line telephone. Examples include cellular telephones and Internet-based communications devices. A variety of solutions have been proposed or attempted to account for new and emerging technologies. Overall, the results have been less than satisfactory, in part, due to a piecemeal solution and/or extensive changes to existing technology.

SUMMARY

Aspects of the present invention are directed to addressing challenges to providing emergency services including those discussed above, and that are applicable to a variety of voice and data applications, devices, systems and methods. These and other aspects of the present invention are exemplified in a number of implementations and applications, some of which are shown in the figures and characterized in the claims section that follows.

Consistent with one embodiment of the present invention, a system is implemented for use with an emergency call center and Voice-over Internet Protocol (VoIP) devices. A plurality of endpoint devices communicate with a location-determination server. The endpoint devices include a location circuit for providing physical location data about the physical location of the endpoint device. A processing circuit generates a data packet containing the physical location data from the location circuit. Output port(s) send the generated data packet to the location-determination server. The location-determination server receives the data packets from the plurality of endpoint devices and determines the nodes in a transmission route used from the plurality of endpoint devices to the location-determination server. The location-determination server calculates a physical location for each of one or more of the determined nodes as a function of the physical location data in said one of the data packets. The location-determination server stores the calculated physical location for the one or more of the determined nodes. An emergency server, in response to an emergency call from a VoIP device, identifies one or more nodes in a transmission route used to send data from the VoIP device. The emergency server retrieves the calculated physical location for the identified nodes and provides the retrieved physical location to an emergency operator.

Consistent with an embodiment of the present disclosure, a system includes one or more servers configured and arranged to provide VoIP services to a plurality of endpoint devices; identify a request for emergency services from at least one of the endpoint devices; identify nodes used to transmit from at least one of the endpoint devices to the one or more servers; determine a location information for the at least one endpoint device as a function of the identified nodes; identify an ANI number other than the number assigned to the endpoint device as a function of the determined location information; and connect the endpoint device to a PSAP service while providing the identified ANI number thereto.

Embodiments of the present invention relate to a gold standard device that includes one or more communication ports for connecting to a network access point; a processing circuit that includes a processor and a tangible storage medium, the tangible storage medium storing instructions that when executed by the processor perform the steps of transmitting, to one or more network access points, a request to send a unique identifier to a location determination server that is remote from the one or more network access points; and transmitting location information to the location determination server with information correlating the location information to the unique identifier.

An embodiment of the present invention is directed towards a computer system that has one or more computer servers. The computer server includes at least one computer processor; and a tangible storage medium that stores computer instructions that when executed by the at least one computer processor perform a set of steps. The steps include receiving physical location data from a plurality of endpoint devices associated with corresponding user accounts; determining nodes in a transmission route between the plurality of endpoint devices and the computer server; calculating a physical location for one or more of the determined nodes as a function of the received physical location data; storing the calculated physical location for the one or more of the determined nodes; and transmitting incentive-based feedback to a device associated with a respective user account.

Embodiments of the present invention relate to computer systems that include one or more computer processors, logic circuitry and/or one or more tangible storage mediums storing a set of instructions that when executed by the one or more computer processors cause the computer system to perform the steps of: receiving an emergency service request from an endpoint device; receiving physical location information of the endpoint device; receiving access node data that identifies an access node used by the endpoint device to send the emergency service request; and transmitting a broadcast request to the identified access node, the transmission of the broadcast request implemented using a protocol that notifies the identified access node that endpoint devices serviced by the identified access node should be notified of emergency conditions.

Consistent with another embodiment of the present invention, an endpoint device is provided that does not have bidirectional audio capabilities. The endpoint device includes a computer processor; a network interface; an emergency circuit; a tangible storage medium configured to store instructions that when executed by the computer processor: detect the activation of the emergency circuit; connect, in response to detecting the activation of the emergency circuit, to an emergency system via the network interface; and communicate with the emergency system via the network interface.

Yet another embodiment of the present invention is directed towards a system that includes a plurality of endpoint devices each having a location circuit configured to provide physical location data about the physical location of the endpoint device; one or more external ports for communicating data to an external network; and a processing circuit. The processing circuit is configured to generate one or more populating data packets containing the physical location data; and transmit the populating data packets to a remote location-determination server. The system also includes at least one location-determination server configured to receive the populating data packets from the plurality of endpoint devices; determine nodes in a transmission route between the plurality of endpoint devices and the location-determination server; calculate a physical location for one or more of the determined nodes as a function of the physical location data in the populating data packets; store the calculated physical location for the one or more of the determined nodes; identify, in response to an emergency request from an emergency-capable endpoint device without bidirectional audio capabilities, one or more nodes in a transmission route used to send data from the emergency-capable endpoint device; retrieve calculated physical location data for the identified nodes; determine a probable physical location for the emergency-capable endpoint device as a function of the calculated physical location data for the identified nodes and a probable location algorithm; provide the determined probable physical location for the emergency-capable endpoint device to an emergency operator; and establish a non-audio communications link between the emergency operator and the emergency-capable endpoint device.

The above summary is not intended to describe each illustrated embodiment or every implementation of the present invention.

BRIEF DESCRIPTION OF THE DRAWINGS

The invention may be more completely understood in consideration of the following detailed description of various embodiments of the invention in connection with the accompanying drawings, in which:

FIG. 7 depicts a system for calculating and assigning incentives for providing populating data, consistent with an embodiment of the present invention.

Figure 1A:
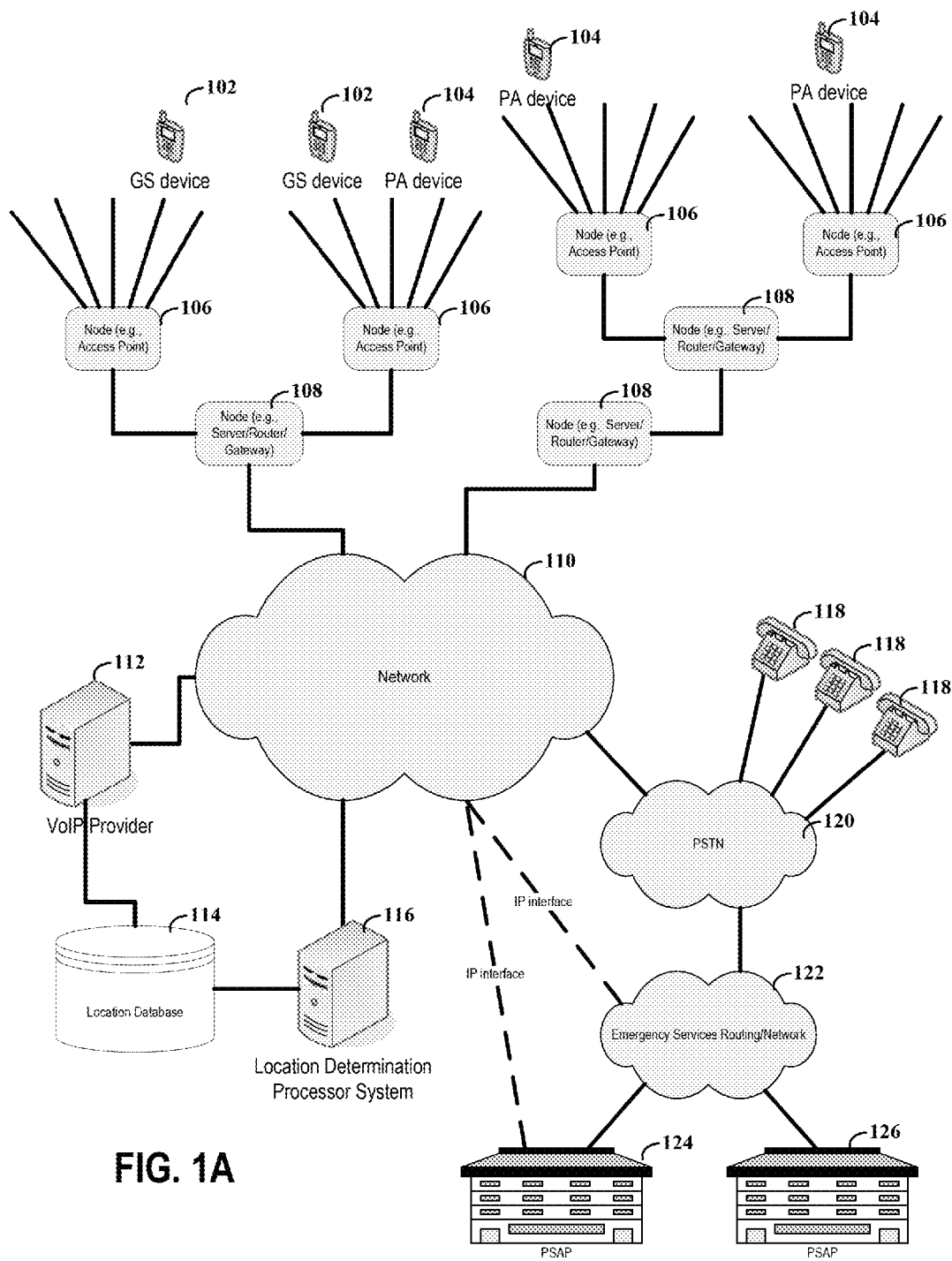
FIG. 1A depicts a system diagram including a location database for use with PSAP locations, consistent with an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is directed to emergency call centers including calls initiated over a network, such as the Internet, and related approaches, their uses and systems for the same. While the present invention is not necessarily limited to such applications, various aspects of the invention may be appreciated through a discussion of various examples using this context.

Aspects of the present invention relate to systems, methods and devices that are useful for providing emergency services to the public. The various embodiments and components discussed herein can be particularly useful as part of a forward looking and comprehensive emergency response system. Notwithstanding, the various embodiments can also be implemented individually or in selective combinations. Effective combinations and modifications of the various embodiments are not limited by the specific embodiments disclosed herein.

One implementation, particularly useful for addressing a variety of issues involves determining the physical location of an endpoint device as a function of the series of connection devices in a transmission route. A remote processor determines a physical location for one or more of the devices at different points in the transmission route. Often, multiple endpoint devices will transmit data through the same data-routing device and can therefore be associated with the location of the shared data-routing device. A particular implementation populates a location-based database using reporting data obtained from remote devices. Data is collected from remote devices that send positional data. Information about the position of the endpoint device is correlated with routing devices used by the endpoint device. From this information, physical locations are associated with the routing devices.

One embodiment of the present invention recognizes that perfect location knowledge of Internet-based communications is next to impossible without significant changes to the underlying devices and protocols. Rather than force drastic changes and enforce strict requirements on Voice-over Internet Protocol (VoIP) providers and users, solutions with surprising flexibility are provided while maintaining the cost-effectiveness of the solution.

One issue with Internet Protocol-(IP) based communications is that there can be a large number of different parties involved in providing a single communication. For instance, a VoIP device can connect to an ISP-provided modem through a local-area-network (LAN) having any number of routing and control devices. The modem can connect to a local ISP gateway, which in turn, connects to a series of routers (e.g., Internet backbone routers). The VoIP device might also use a remote VoIP service provider to establish a connection with a called party (e.g., a remote server useful for establishing SIP connections). This is just one example of the myriad of different possibilities and shows the number of different devices and parties involved with even a simple VoIP call.

According to a specific implementation, IP devices are implemented to provide "gold standard" data for location determinations. These gold standard IP devices (GS devices) are specifically designed to provide accurate and secure location information for helping to populate the location-based database. An example usage is to provide emergency personnel with GS devices. As the emergency personnel move between different locations, the GS devices can send data that is used to populate those locations in the database. The GS devices can be carried by the emergency personnel during responses, during work-related functions and also during personal activities as desired. The population of the database through GS devices can be part of a coordinated effort to populate the database or population can occur organically as different network connection points are encountered by GS device users.

According to one embodiment of the present invention, the GS device uses a wireless connection to detect and connect through available wireless networks. When a wireless network is detected, the GS device can be set to automatically connect or to prompt a user to initiate a connection. Unsecured networks present little difficulty; however, secured networks often require a password or key to obtain access. One aspect of the present invention relates to providing position information for secured networks. This can be accomplished by configuring wireless connection points to allow access by GS devices without necessitating knowledge of the password or key by the GS device. If this access, however, is not carefully implemented, it can introduce security risks for the wireless connection point. Accordingly, particular security measures can be included into this process and will be discussed in more detail hereafter.

Embodiments of the present invention relate to allowing GS authenticated devices limited access. The access can be restricted in a manner that does not present much of a security risk should the authentication of the GS device be compromised. For instance, an access point can limit the amount of data transmitted and received by a GS authenticated device. This helps prevent significant bandwidth from being consumed by a GS device, as may occur if a nefarious party attempts to spoof a GS device to gain access to a secure network. Accordingly, a variety of data-limiting controls are implemented. One such control limits the amount of data any particular device can transmit during a particular time period. Another control prevents transmission from undesired locations. Still other aspects limit the access to specific packets and/or provide a GS-based encryption scheme that effectively maintains isolation between the GS device and other devices that may be sharing the access point.

According to an embodiment of the present invention, a GS device is used to allow for easy setup by system administrators and other users. In a generic local-area-network (LAN) setting, there can be a large number of connection points spread out over a geographical area. For example, a large office building may have data wiring throughout with multiple connection points (e.g., RJ11 Ethernet outlets or wires) for various computers. The GS device is configured to connect to the various connection points and to send location information for each connection point to populate the database. The GS device can directly connect to the connection point or connect through a computer, printer, wireless router or other device. For instance, the GS device can include wireless-Ethernet (direct), wired-Ethernet (direct) and USB (through another device). Further details of this GS device and population methods using such a GS device are provided hereafter.

This can be particularly useful for allowing trusted individuals to populate the database with known good data. For instance, a system administrator can walk around a facility with a handheld GS device to provide information about different locations within the facility.

While GS devices provide a solid starting point for populating the location database, embodiments of the present invention are based upon the recognition that such devices have their limitations. Accordingly an embodiment of the invention uses existing devices to provide additional data for populating the location database. This can take the form of a populating application (PA) that is downloaded or otherwise installed on communication devices. The PA sends location information when the communication devices are connected to the Internet. This allows for an effective mechanism to be used to populate the location database from input from many different devices.

In one implementation, the PA is provided as part of a VoIP service. A VoIP user installs the PA as part of the setup process for the VoIP service. The PA can be configured to provide population data automatically upon Internet connection, periodically, upon use of VoIP services and/or upon prompting by a user or external source.

According to another implementation, the PA can be independent of VoIP services. This can be useful for widening the source of devices that provide information for populating the database. The PA can be a standalone application or bundled with other applications. For instance, the PA can take advantage of people's willingness to help by allowing voluntary downloads of the PA software.

According to a specific embodiment, the progress of the populating is linked to a map service, such as Google Maps™. PA users can check current population locations by linking to associated locations on (online) map services. This provides constant feedback to the PA users to help incentivize participation. Moreover, the users can provide additional location information using the mapping feature. Thus, while various aspects of the present invention use efficient and accurate location algorithms to populate the database, a human element can also be used. This can be particularly useful for improving the accuracy of the location database using distributed input from many individuals.

One particularly useful embodiment implements the PA in the form of a competition and/or game. Users are given credits, points or other benefits for providing accurate location information. In a particular implementation, PA users can view the locations that they have personally mapped along with an accuracy rating for input that they have provided. This encourages users to validate and confirm automated location information that their personal devices provide. PA users can also compete against or with others, including their friends. This can be facilitated by integrating the PA with social networking sites, many of which provide links between friends and allow for applications to be easily accessed from their respective websites. Other online services, such as Google Latitude™ or Foursquare™ provide mapping-based functions that can be used in coordination with a PA. These, and other, services can be integrated with the PA using APIs. The adoption of PAs can therefore be broad-based and accessible through a variety of different avenues.

Certain implementations provide rewards for providing populating information. These rewards can be structured to incentivize particular information to be provided. For instance, the reward system can be configured to provide diminishing returns for additional information from particular locations and/or access nodes. This encourages participants to provide populating data for new locations rather than providing additional information for a location that is already sufficiently populated. Thus, public access points widely-used by many participants would provide less reward points than relatively obscure access points. The reward points can be redeemed for a variety of different rewards. For instance, a VoIP provider might offer free minutes or rebates on bills.

As another example, existing (or new) applications, such as Foursquare™, provide competitions for reporting locations and associated information. Aspects of the present invention integrate the location population with such applications. This can include, for instance, offering rewards through these types of applications and/or receiving additional location data from the servers that provide these applications to users.

Accordingly, there are a number of different feedback mechanisms that can be used to provide users with feedback regarding their participation in populating a location database. The various feedbacks can be implemented by associating incoming data with a user account and then providing the feedback to a particular device corresponding to the user account. Thus, the feedback can be sent directly to a user device, such as a VoIP device, transmitted via email, made accessible over a website (e.g., via a social website) and/or in various other locations.

The collected and analyzed location information can be provided as part of a service that is useable by each of VoIP providers, emergency service providers, and government agencies. This service can be billed as a periodic charge, per users and/or based upon other factors.

Particular embodiments limit such transmission to a specific packet that is tailored for this usage. The packet size is tightly controlled and provides a limit on the amount of data transmitted. Packets that do not meet the specific packet format can be easily filtered out before reaching the server, e.g., using network firewall type hardware and/or software.

Other embodiments of the present invention use both GS- and PA-enabled devices to populate the database. A particular usage of both devices uses the GS-enabled devices as a benchmark to establish locations for the PA-enabled devices. For instance, an adaptive algorithm is employed to determine the physical location from the provided data. This adaptive algorithm can be initialized, weighted or taught using the GS-enabled data. For instance, the algorithm can determine how best to assess PA-provided data by assessing the results of GS-enabled data for similar locations or situations. Examples include various adaptive learning algorithms such as supervised classification.

Supervised classification can be implemented by labeling input data with known position data from a GS device. A hypothesis algorithm is built that accurately matches this data and is used to establish locations for PA-enabled devices. This hypothesis algorithm, however, can be changed in response to inputs from PA-enabled devices. If the location data from the PA-enabled devices is consistently at odds with the hypothesis, the algorithm will shift the hypothesis towards the data from the PA-enabled devices.

In certain implementations, the algorithm identifies predictors that have high correlation to location information received from GS or PA-enabled devices. The data retrieved from the PA-enabled devices can be limited to the highly-correlated predictors, thereby controlling the amount of data transmitted from the PA-enabled devices.

As discussed herein, population of the location database can be accomplished by linking to nodes, within a connection/transmission route between a PA or GS enabled device, to physical locations. According to one implementation, nodes are assigned a proximate location based upon data obtained from endpoint devices. The proximate location can be set according to direct links between nodes. For instance, a node that receives connections from three other nodes will be assigned a location that is dependent upon the location of the three nodes. The sequence that the data travels between nodes provides an indication of association between the nodes. A number of algorithms for determining their locations are possible. One particular example uses a learning network approach in which nodes are connected by probability indicators that are a function of the physical locations. The parameters that can be used to assess and generate the probabilities can be based upon a probable connection type (e.g., wireless, electrical or optical fiber), as well as the locations of the other nodes. Locations that are known with a high degree of certainty are heavily weighted to prevent movement of their locations by the algorithm. Locations with a low degree of certainty are allowed more freedom of movement.

Consistent with another embodiment of the present invention, a processor system is configured and arranged to use data from a populated location database to interface with a PSAP switch that routes calls in response to ANI signals. The processor system determines the physical location of the caller using the populated location database. The PSAP switch has a 911 location function that controls call routing according to received ANI signals. In particular, the 911 location function can use a database of locations associated with various telephone numbers represented by ANI signals. For VoIP users, however, the caller's telephone number is not necessarily determinative of the caller's current location. Thus, rather than providing ANI signals corresponding to the caller's telephone number, the processor system uses ANI signals corresponding to the determined location. The PSAP switch will then route the call accordingly.

The specifics of how such ANI signal control and PSAP routing are handled can be accomplished according to different implementations. According to one specific implementation, the PSAP 911 location function is configured with a set of reserved telephone numbers (or set of ANI signals) that correspond to various physical locations within the different PSAP service areas. As an example, consider the simple situation of a first PSAP location in city A and a second PSAP location in city B. The PSAP switches route calls with ANI signals linked to city A to the first PSAP and those originating from city B to the second PSAP based upon a database of ANI signals (i.e., caller numbers) defining which city the call originates from. For a VoIP call, the processor system determines whether the 911 call originates from city A or B. The PSAP database includes a set of numbers reserved for VoIP calls and that correspond to one of the cities. The VoIP call processor system uses these reserved numbers by way of the ANI signals to help the PSAP switch correctly route the call.

A number of variations and additional components can be implemented as desired. According to one such additional component, the reserved (ANI) numbers can indicate to the PSAP operator that the caller is using a VoIP connection. This allows for a variety of different options. For instance, the PSAP location can be enabled to access, or receive data from, the populated database for the purpose of determining a precise physical location of the caller. This information can be provided automatically with the call or in response to a request by the PSAP operator. Other data that can be retrieved includes a call-back number and a confidence factor as to the accuracy of the physical location. This confidence factor is discussed in more detail herein. In some implementations, the set of numbers for a PSAP location can provide further details regarding the location of the caller. For example, the set of numbers could correspond to respective areas within the city, thereby providing location information. The granularity of this location is a function of the amount of numbers within the set as well as the size of the geographic areas corresponding to each number.

In one instance, the provided ANI number is temporarily linked to the particular VoIP caller. This linking allows the PSAP operator to call the VoIP caller back using the ANI number regardless of the more permanent VoIP telephone number. This helps alleviate the need to somehow provide the more permanent VoIP telephone number as a call back option.

In one implementation, the determined location information is also sent to the caller. In this manner, the caller can be made aware of the location information that is provided to the PSAP operator. The system provides an interface for the caller to confirm or edit the information as necessary. This allows a secondary confirmation mechanism that can be separate (or in addition to) verbal communications. One implementation establishes a direct connection between the PSAP system and the caller to bypass the need for the VoIP service provider to handle the data transfers. This confirmation mechanism can be augmented using various mapping applications. For instance, the user can be prompted with an interactive map. The user can zoom in and out and select their location, or even select a location of the emergency. This can be particularly useful for when a user is calling on behalf of others or to report a problem that is not necessarily located at the same location as the caller.

In some implementations the reserved ANI numbers can also be used to convey additional data. For instance, within the same physical location different numbers can be assigned according to other relevant information. As a non-limiting example, certain ANI numbers can be associated with the type of device used by the caller (e.g., whether or not the device is a mobile device or a desktop computer). This type of information can also indicate whether or not the device has other connection capabilities, such as cellular connections. For instance, some cellular-capable telephones can also connect using VoIP connections. Knowledge of this capability can allow an emergency operator to attempt to locate the cellular device by having the cellular provider locate the device and/or allow the emergency operator to use the cellular connection to call back the individual.

Another aspect of the present invention relates to privacy and security aspects. One concern of users may be the privacy of their location information. Various steps are taken to protect the identity of any particular user. One implementation involves a one-way transmission of data from individual user devices to a location determination system. The location determination system operates in a listening mode to collect the one-way transmissions. The one-way transmission need not send data that would uniquely identify the user device because the location determination system does not respond to the transmission. If desired, a unique identifier can be sent, however, the identifier can be generated by the user device in a manner that does not allow the information system to identify the actual user device. For instance, the user device can generate a random number and use this random number as the identifier. This allows the location determination system to associate data from particular user devices without having identification information that is used in other manners to identify the user device (e.g., a MAC address). This type of association can be particularly useful as a parameter in the location determination algorithm.

Various embodiments of the present invention relate to providing useful data to a PSAP operator. In particular, the PSAP operator can be provided with a confidence factor that indicates the probability that the indicated location is correct. For instance, a non-mobile device connecting through static connection point(s) for which a physical location has been confirmed, would have a relatively high confidence factor, whereas a mobile device that often connects through many different connection points and that is currently connected through a connection point for which the physical location is only proximate, would have a relatively low confidence factor. The PSAP operator can use this confidence to dispatch emergency personnel accordingly. Other information can also be provided, such as how the confidence factor was determined. For instance, the PSAP operator could be provided with the name of a server/node within the communication path. The PSAP operator could then independently assess the accuracy of the location information.

As discussed herein, the location-database stores physical location data for nodes other than just the endpoint devices. Thus, the location of mobile endpoint devices can be determined as a function of physical location of the node to which the endpoint devices connect. Implementations of the present invention recognize that this flexibility in endpoint devices can be particularly useful for applications other than traditional VoIP services. PSAPs are modified to have direct access to the Internet. Endpoint devices other than those functioning as VoIP services can connect to the Internet-enabled PSAPs. While the endpoint devices need not be so limited, one implementation uses relatively secure endpoint devices to access the emergency services. For instance, the device could be a relatively small circuit that includes a key or identifier that is registered as valid by the PSAP or VoIP service providers. The Internet-enabled PSAPs would verify that the incoming emergency connection was from such a device, using the key or identifier.

In one implementation, the device is a standalone device that functions primarily or only as an emergency device. In another implementation, the device is designed to interface with an Internet-capable device. For instance, new hand-held devices are entering the market and not all have voice capabilities (e.g., Kindle™). The hand-held devices, nevertheless, have data access to the Internet. In one implementation the hand-held devices include an emergency circuit or chip that can be enabled. The circuit or chip can contain a nonvolatile storage memory that contains a security key or identifier. This circuit can be accessed using a variety of different protocols. For instance, a simple data communications protocol is an I2C bus. The circuit could also communicate using wireless communications, such as near field communications.

Once this circuit is enabled and/or verified, the hand-held device connects to an Internet-enabled PSAP. Location information can be obtained from the hand-held device, if available, and also from the location database. To help avoid accidental enablement of the emergency circuit, the emergency circuit can require physical detachment from the device, possibly coupled with insertion into the hand-held device.

FIG. 1A depicts a system diagram including a location database for use with PSAP locations, consistent with an embodiment of the present invention. Remote devices in the form of GS devices 102 and PA devices 104 provide location information through node access points 106. These devices can provide location information obtained from GPS, local cellular towers, input from users and other sources. The GS and PA devices have knowledge of the access point to which they are connected and possibly other nodes 108 (e.g., gateways) further removed from the access point. The access point information and the location information can then be sent to VoIP provider 112 and/or a specific location determination server 116 over a WAN 110 (e.g., the Internet). This information can then be stored in a location database 114. The location database 114 can be implemented using a tangible storage medium that can include one or more storage devices (e.g., hard disc drives and other persistent storage devices).

PSAPs 124 and 126 provide emergency services to calls from both traditional telephones 118 (e.g., landlines or cellular) and from VoIP devices. Emergency service routing network 122 routes calls to the proper PSAP location and can receive inputs from the Public Switched Telephone Network (PSTN) 120 and/or WAN 110. The traditional model uses ANI information to determine a PSAP that serves a physical location associated with the particular ANI number. The call is then routed to the proper PSAP. New models for emergency services provide an IP interface to receive emergency calls from individuals. This IP interface can be routed through the emergency service routing network 122 or sent directly to a PSAP.

The location determination server 116 can assimilate information from a variety of devices to assess the locations as a function of their respective connection points and the path through which communication passes. This allows the location of devices connecting through a particular access point to be determined with an improved degree of certainty. Aspects of the present invention relate to the ability to associate location information with numerous nodes used in the transmission of the data between remote devices and the location determination server 116. The location determination server can then derive a location for a particular device as a function of the nodes through which a particular transmission is sent.

In some configurations a remote device does not have direct knowledge of nodes beyond a local network. For instance, the remote device may be located behind a NAT router, a firewall or similar node. Thus, the remote device's information may be limited to that relating to the LAN on which it resides. This information, however, may still be very useful. For example, the nodes that the remote device has access to may not be visible or directly accessible to external devices, such as the location determination server 116. Thus, the remote device (e.g., GS devices 102 and PA devices 104) can provide this information to the location determination server 116. This can be done, for example, by placing the information about the local nodes in the data-payload portion of the communicated packets. Should the downstream nodes remove, replace or otherwise modify the TCP/IP level information, this information can still be maintained.

To protect internal information about the LAN from being obtained by an undesirable party, the data can be encrypted. For instance, the data can be encrypted using a public encryption key for which the location determination server 116 has the private decryption key.

The location determination server 116 receives data from various remote devices and uses an algorithm to determine the likely location for the devices. The algorithm uses information about the access point and other transmission nodes to make this determination. Some remote devices have the capability to determine location from other sources (e.g., GPS, cellular, LORAN or other). The location determination server 116 can receive such location information and then match the location information against the results of the algorithm. The location can be adjusted accordingly and/or both sets of information can be maintained to assist emergency personnel at a PSAP.

When an emergency call/request is placed by an IP device serviced by the VoIP provider 112, location information from location database 114 is used to route the call to the correct PSAP. For legacy PSAPs, the VoIP provider 112 can modify the ANI information to assure that the call is correctly routed. The PSAP can reserve a number of ANI numbers for IP-based connections. The ANI number can therefore indicate both a probable location of a caller and that the connection is IP-based. This information can be very useful to an emergency operator as it can help determine the accuracy of the location information among other things.

The algorithm used to determine a probable location can also determine a confidence level for the determined location. This confidence level can be provided to the emergency operator so that it is clear that the call originates from an IP source for which the location may or may not be well known. If the provided location does not have a high confidence level, the emergency operator can then attempt to confirm the location through other means. These other means can include confirming the location by direct communication with the calling party. If this is not possible or convenient, the system can provide the emergency operator with the ability to send out a request for additional location information from other devices using the same access point. The request can be sent in the form of a broadcast message sent to an access point of the endpoint device. The access point can then send an appropriate request to connected endpoint devices. Endpoint devices (e.g., PA and GS devices) can be configured to detect this request and to provide any location information that they may have. Thus, while the calling device may not have GPS or similar capabilities, the emergency operator can still receive this information from another device using the same access point. In certain implementations, the broadcast request for additional location information can be sent in response to the confidence level of the location information being below a particular threshold.

An additional piece of information that can be stored in the location database is contact information for the operator of the access point used by the calling party. This information can be used to notify the operator of an emergency situation. In certain instances, a company-wide notification could be sent out over the LAN to warn all individuals of a potentially dangerous situation. This option could be provided to the PSAP operator using the LAN information stored in the location database 114. Many companies and educational institutions provide LANs for individuals located on their premises, thus, should there be an emergency call sent in by an individual located therein, individuals using the LAN could be notified at the discretion of the PSAP operator.

In a particular embodiment, the PA includes functionality to receive emergency notifications from PSAPs and other sources. The notifications are detected by the PA and appropriate notification can be provided by the device running the PA. This allows the use of a simple broadcast transmission that is detected by any and all PA devices connected to a particular node. If the location database 114 contains information about particular access nodes, the broadcast can be targeted to specific access points as desired.

For instance, a user may call into an emergency services provider. The user might indicate to the emergency services operator that there is an emergency situation that affects a number of individuals in a physical location (e.g., a school, a building or within a certain radius of the emergency causing problem). The system can display a list of nodes corresponding to the physical location of interest to the emergency operator. An input interface allows the emergency operator to select one or more of the nodes from the list of nodes. If necessary, the emergency operator can send a broadcast message to the appropriate nodes. The broadcast message can contain emergency instructions or other useful information. The receiving access nodes recognize the emergency protocol and forward the broadcast message to connecting endpoint devices. The connecting endpoint devices recognize the broadcast message and can in turn provide appropriate warnings to individuals.

In a particular instance, the broadcast message is sent to an access node identified as supplying service to a university after an emergency operator receives notification that there is a gas leak, a bomb threat or similar emergency. Endpoint devices receive the broadcast message allowing for fast and efficient notification and instructions to be sent to many individuals.

The emergency broadcast message and associated protocol can be built into the PA, however, other applications can also recognize the emergency broadcast messages. The protocol can be implemented in a variety of manners. One method involves sending transmissions to an IP address that is reserved for emergency services. Other methods can use existing broadcast protocols. To prevent unwanted use of emergency broadcast messages, security protocols can be implemented to prevent unauthorized devices from using the emergency broadcast protocols. For instance, the broadcast messages can use encrypted data to verify that the source of the data is valid. Public/Private key encryption techniques provide one mechanism for verifying the source of data, but are merely an example of possible verification techniques that could be employed.

A particular embodiment is directed toward the use of a broadcast message to direct an endpoint device to connect to another transmission that can provide further information. For instance, the broadcast message can include one or more IP-multicast addresses for endpoint devices to connect with. The endpoint devices subscribe to the IP-multicast address to receive emergency information, such as notifications and instructions. The IP-multicast or similar solution allows for the information to be provided using text, audio and video as desired.

Figure 1B:
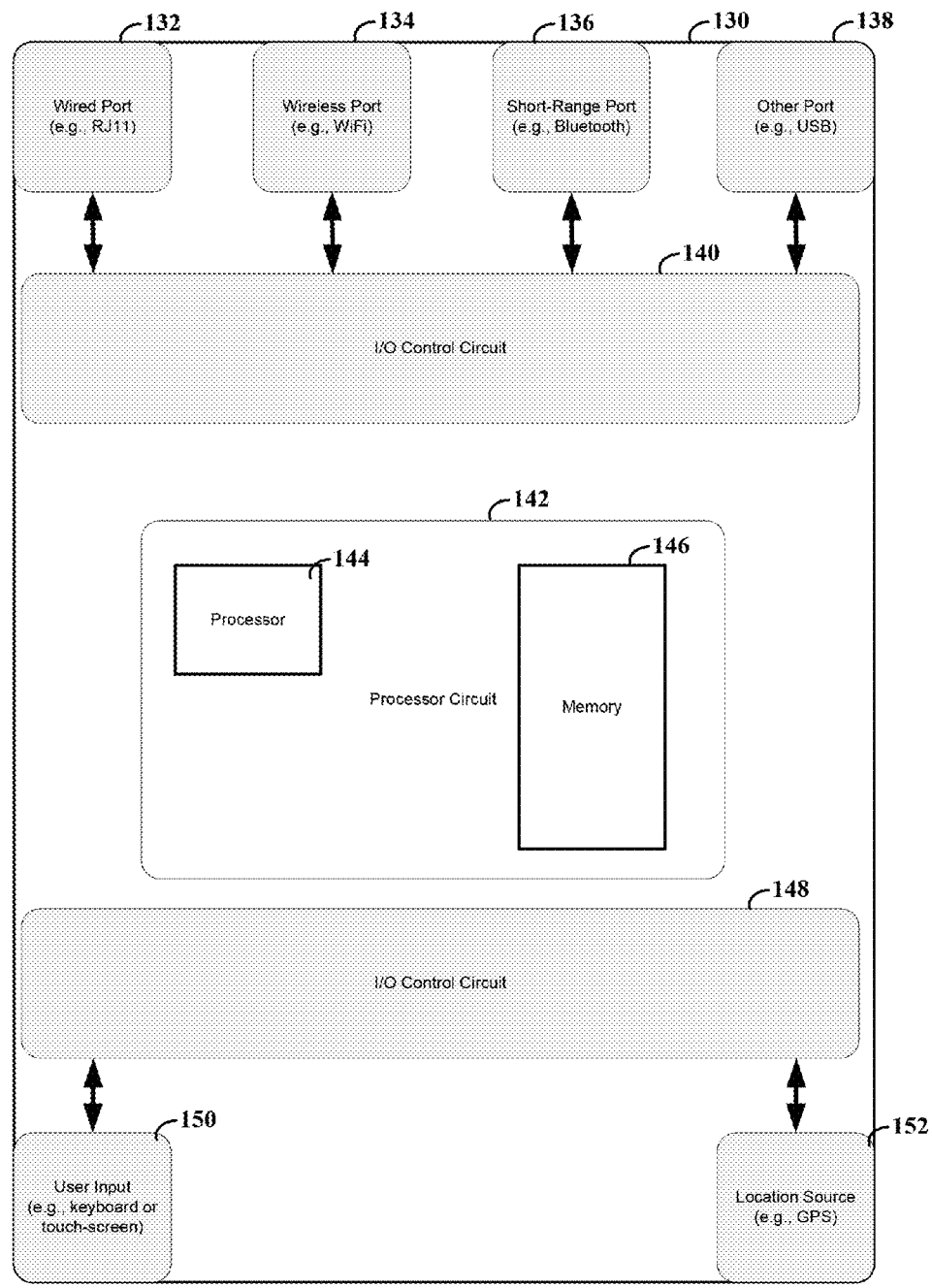
FIG. 1B depicts an endpoint device for providing data to a location database, consistent with an example embodiment of the present invention.

FIG. 1B depicts an endpoint device 130 for providing data to a location database, consistent with an embodiment of the present invention. The device of FIG. 1B is consistent with either a GS device or a PA device. In particular, a GS device can include a number of different interfaces that allow for population from numerous types of access points. This allows for a GS device operator to provide database-populating information for a large number of different locations. The GS device could then be given to, for example, a fire inspector so that the GS device is brought to each building being inspected. The inspector can maintain/confirm location information for the GS device as necessary and/or the location information can be automatically updated (e.g., using location source 152). For instance, at the start of an inspection of a building, the GS operator can enter or confirm the address of the building using user input 150. The GS device can then connect to the local access points within the building and provide GS data to the location determination server 116. This connection can be implemented in a number of different manners.

In one implementation, the GS device can be granted direct access to an access point in a conventional manner. For instance, the GS device can connect to an unsecured network through any of I/O ports 132-138. The inspector could also be given security information (e.g., login/password) to allow the GS device to connect to a secured network. This mechanism, however, requires a degree of coordination that can frustrate the population of the locations for each access point. Accordingly, the system provides a method for automatic population from a GS device.

In certain implementations, the GS device is configured to send a priority message designed to assist in populating location information for any access points receiving the priority message. Some existing protocols allow access from unauthorized devices for emergency purposes. The GS device could use such protocols to send populating data. Alternatively or in addition, modifications to the access points/protocols could be implemented to provide GS-specific access. For instance, compatible wireless access points could be configured to listen for broadcast messages from the GS device. These broadcast messages can be wireless or wired and sent using various different protocols.

Certain implementations involve the ability to limit the access provided to a GS device, without severely hindering the ability to automatically populate the location database. For instance, the GS access could be limited to very low data-bandwidths, only allowed for minimal connection time periods and/or limited to the use of a specific data communications protocol or packet.

One such protocol operates by the GS device sending a request that all access points send a unique identifier to the location determination server 116. Access points that receive the requests send the unique identifier, contained within a populating data packet, to the location determination server 116 along with information identifying the access point. The access points need not (but could) provide confirmation of this transmission to the GS device. In this manner, the GS device does not necessarily obtain any information about the access nodes that may or may not be present. The GS device associates the unique identifier with a current location. Subsequently, the GS device provides the current location to the location determination server 116 in such a manner as to allow the location determination server 116 to correlate the location information back to any unique identifiers received from access points. This can be done by connecting the GS device to an access point for transmission over the Internet, directly connecting the GS device to the location determination server, downloading the location information to another device for transmission thereby or any number of other methods. This procedure of automatically populating a location database with information about different access points can be particularly useful because the GS device can operate in a substantially automated mode that places minimal burdens on access points and that presents relatively low security risks.

The GS device can also transmit security information designed to authenticate the GS device with one or both of an access point and the location determination server 116. For example, the security information can be a secure/encrypted identifier. The location determination server 116 can decrypt and validate the identifier against a list of known good identifiers. The security information can be contained within the unique identifier and/or sent as a separate piece of data.

PA devices can also use similar mechanisms as a GS device. However, given the relatively less secure nature of PA devices, access to secure networks could be further limited or not allowed. For instance, updates using a communications channel/protocol reserved for allowing unauthorized devices access for the purpose of populating could be limited to GS devices by requiring certification to accompany any request for such access. The certification could be in the form of an identifier of the specific GS device.

A PA device (or a GS device) can simply populate the location determination server 116 when connected to an access point that allows for normal communications. For example, when an owner of a PA device connects to an access point, such as at a coffee shop or other business, the PA device could send populating/location information to location determination server 116.

The various functions of the GS and PA devices can be carried out by processing circuit 142. Processing circuit 142 can include one or more processors 144. Processor 144 can execute instructions stored in a tangible storage medium 146 (e.g., Flash memory, RAM or a hard drive) to carry out the various algorithms and steps discussed herein. The tangible storage medium can include one or more storage devices (e.g., hard disc drives and other persistent storage devices). Processor 144 can interface with external inputs through I/O control circuits 140 and 148. The specific inputs and outputs are not limited by the few examples shown in FIG. 1B.

Consistent with various embodiments of the present invention, the GS device can be sold as a device specifically designed for populating a location database. The device can include a programmed security identification/code that can be used to authenticate each device and to correlate information received with particular devices. In other embodiments, certain individuals can be given access to a GS application that can be downloaded and run on their personal devices (e.g., smart phones, GPS devices or laptops). Access to the GS application can be limited to trusted personnel so as to avoid erroneous data from being introduced in to the GS-based data. For instance, emergency personnel (e.g., homeland security, police, medical and firefighters) could be given access to the GS application for downloading to a device that they own or operate. The device could be a personal device or one issued by their employer or the government. Particular aspects relate to maintaining an updated list of valid GS devices/applications. For instance, when an individual changes employment, their GS-application can be deactivated. In a particular implementation each GS application is active for a limited time period (e.g., six months). After the time period expires the GS application must be renewed and/or a new application downloaded. Control over the renewal could be as simple as requiring that the renewal happen through a LAN only accessible to currently authorized personnel. In this manner, the employer or government agency need not maintain a separate list of GS-authorized personnel and can instead use existing restrictions on access to internal LANs or the like.

Figure 2:
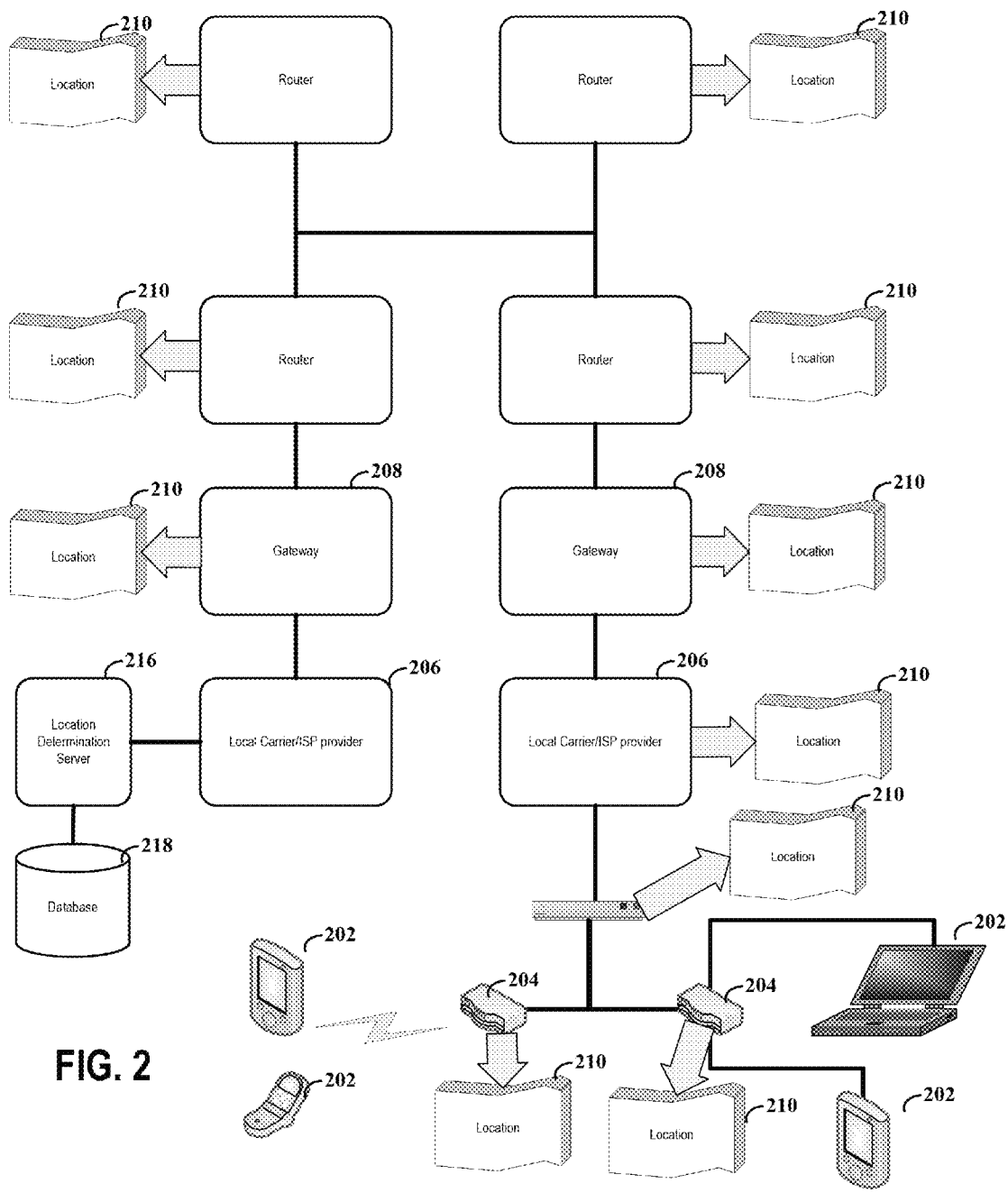
FIG. 2 depicts a routing path with various nodes and associated locations, consistent with another example embodiment of the present invention.

FIG. 2 depicts a routing path with various nodes and associated locations, consistent with an embodiment of the present invention. Aspects of the present invention relate to mapping the route data takes through the network. Information about the various nodes involved can be used as inputs to determine the probable location of a particular node. From the probable locations of nodes within a particular path, information about the physical location of an endpoint device 202 can subsequently be determined.

Existing protocols include methods for requesting information about the route a packet takes. For example, the 'traceroute' tool requests identifying information from nodes within a routing path between a sender and receiver. For security and other reasons, however, many nodes block or do not respond to these types of requests. Accordingly, a specific tool can be implemented that is reserved for population of location information. This tool includes a number of safeguards to help alleviate concerns over divulging information regarding the layout of a particular private network. One such safeguard allows a gateway node 208 to encrypt the information before sending over the WAN. The gateway can control where and how the information is sent to assure that it is not being routed to a nefarious location. Another safeguard allows a node to use an identifier that does not correspond to the true address of the node. Thus, while the identifier is useful for distinguishing the node from other nodes, it does not provide information useful to attempt to communicate with the node. For instance, instead of returning a set of IP or MAC addresses for the nodes of a particular path, a set of pseudo random numbers is used. If desired, these numbers can generate information unique to the node to help prevent two different nodes from using the same number or could simply be another unique identifier assigned to all nodes in a similar manner as a MAC address.

The location determination server 216 receives information about a particular set of nodes used to transmit data from a remote device. If the database 218 has not been populated for one or more of the nodes, then the location determination server 216 can generate location information about the nodes. This location information can be generated, for instance, by associating the nodes with location information provided by a PA or GS device. Nodes closer to the PA or GS device in the logical transmission sequence would generally be given a greater association to the location information of the remote device. For instance, access points 204 could represent wireless or wired access points. In either event, the likelihood of an endpoint device 202 being physically located near the access points 204 is relatively high. Further down the line, the node provided by a local carrier and/or an ISP provider 206 is likely to be relatively distant from the endpoint device 202. Thus, the association between the location of the endpoint device 202 and this node 206 is likely less than that of the access point. The associations, however, need not be limited strictly based upon the logical distance between the nodes. Instead, aspects of the system allow the associations to be learned through analysis of location information received from numerous GS or PA devices. Thus, for some (unknown) reason a logically distant node may provide a high level of certainty regarding the location of the endpoint device 202. This could be, for example, a side-effect of the type of device being used or a configuration of a particular network.

In this manner, the location data 210 for the nodes can be developed over time by accumulating more location data as it is received. In some implementations, the true physical location of the node is not necessarily represented by the location data. This is because the location data can be developed as a function of the relation of the node's use to the probable location of an endpoint device that uses (or does not use) the particular node. A location for a particular node can therefore be stored in the form of a geographic area based upon the probability that an endpoint connected to the node is within the geographic area. Thus, the location information might more accurately represent a service area for the node than the true physical location of the node. Notwithstanding, knowledge of the true physical location of a node can still be used and provided.

Figure 3:
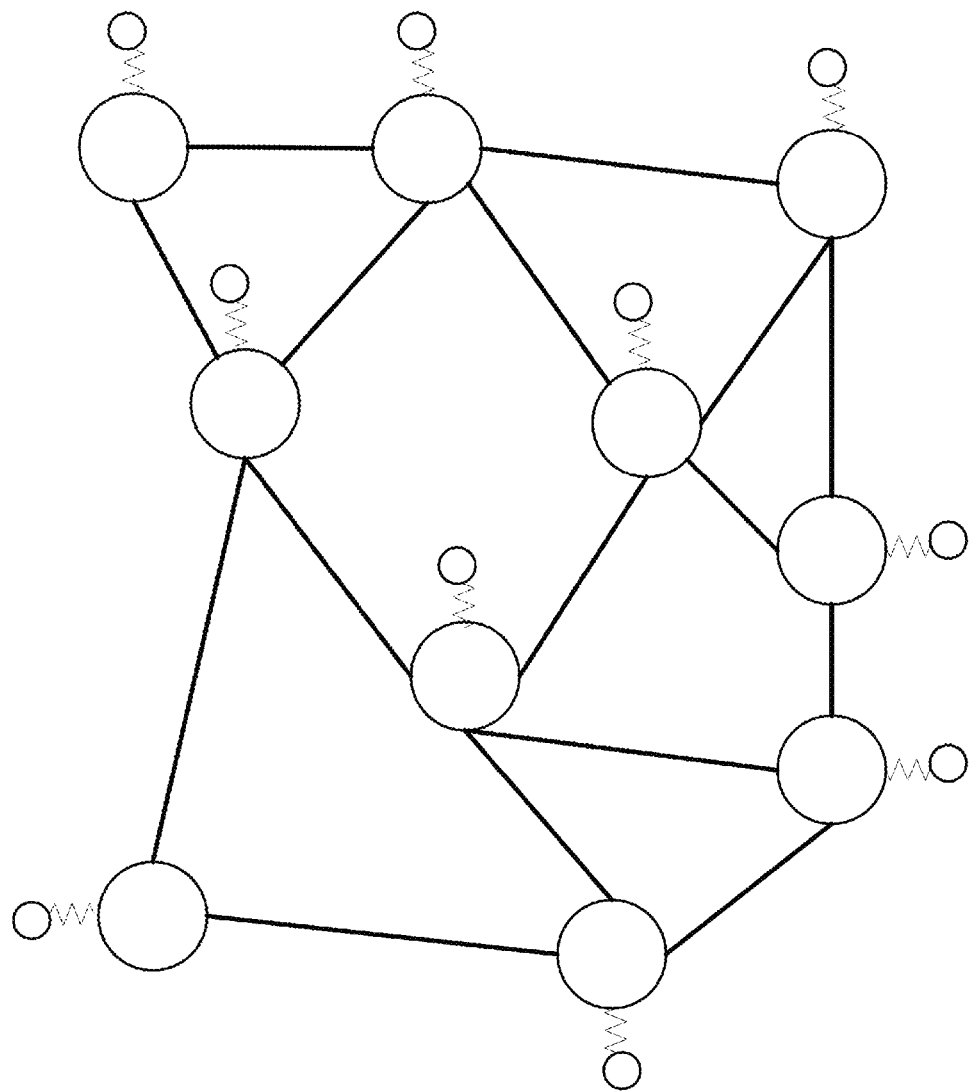
FIG. 3 depicts a diagram of nodes, their respective determined locations and susceptibility to changes to the determined locations, consistent with another example embodiment of the present invention.

FIG. 3 depicts a diagram of nodes, their respective determined locations and susceptibility to changes to the determined locations, consistent with an embodiment of the present invention. The large circles represent nodes and their logical connectivity with other nodes, e.g., as determined by a trace of the transmitted data. The small circles represent currently-determined physical locations. Using connection relationships between the nodes and other data the location points can be updated in a manner that selects a location that correctly models the association between an endpoint device's location and the use of the node within the context of the entire system.

The springs attached to the current location represent resistance to changes for each individual node. The spring strength, or weight, can be determined as a function of the confidence level for the particular location. Thus, nodes with high confidence levels will be more resistant to changes in location, while nodes with lower confidence levels will be allowed to change more readily. The location information can be represented as a specific location or as one or more areas that an endpoint device is likely to be located within.

For instance, a node that serves as a gateway for a university may have a strong association with physical locations that correspond to the campus of the university and surrounding areas. Thus, the location information for this gateway may have a high association with endpoint locations at or near the campus and a low association with any other physical locations. Other nodes may service such a wide location so as to have a very low association with any particular area. Notwithstanding, even such nodes can be useful where, for instance, a particular combination of nodes has a high association with a physical location.

Figure 4:
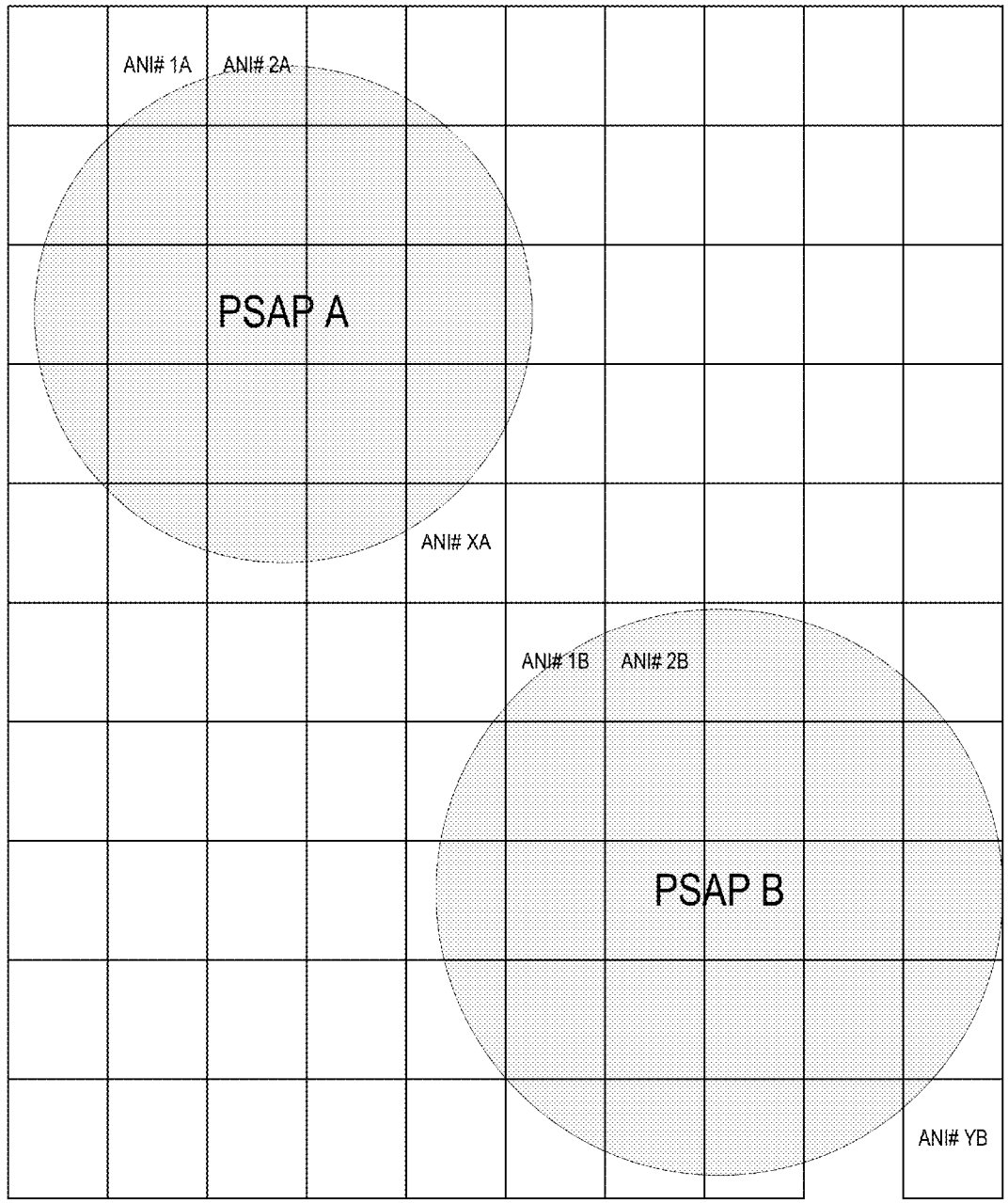
FIG. 4 depicts a diagram of two geographically different PSAP areas and associated portioning according to specified ANI numbers, consistent with another example embodiment of the present invention.

FIG. 4 depicts a diagram of two geographically different PSAP areas and associated portioning according to specified ANI numbers, consistent with an embodiment of the present invention. Various embodiments of the present invention relate to the use of ANI numbers to route IP-based emergency communications to an appropriate PSAP. In certain implementations, a set of ANI numbers can be reserved for use in PSAP routing. These numbers are selected based upon a determined probable location for an IP-based communication.

As depicted in FIG. 4, each of PSAP-A and PSAP-B are responsible for a respective geographical area denoted by the respective circles. ANI numbers from the reserved set are assigned according to grids identifying different physical locations. For instance, PSAP-A covers areas that correspond to ANI numbers 1A-XA, and PSAP-B covers areas that correspond to ANI numbers 1B-YB.

When an emergency IP-communication is requested, a probable location is determined for the requesting endpoint device. The ANI number associated with this probable location is then used to indicate the appropriate grid location. The call can then be routed using existing PSAP routing technology.

The Emergency operator can be provided with an indication that the call is IP-based. This can serve as an indication that the physical location may be imprecise. Moreover, additional information can be provided about a more precise probable location for the calling party (e.g., through a separate IP update from the location determination database).

This configuration can be particularly useful for providing backward compatibility with existing PSAP systems as they transition to supporting IP-based communications. Moreover, the location database can be constantly updated with new locations for various devices without having to propagate the updates through each separate PSAP system. This is especially important for VoIP communications that are available to mobile devices that can connect from virtually anywhere.

In certain embodiments, there can be any number of ANI numbers associated with the same location. The reserved ANI numbers within each location can be used to convey additional information. For instance, some ANI numbers may indicate that there is additional information available about the calling party. For instance, a VoIP provider or emergency location provider can store emergency information for subscribing users. When the user places an emergency call, an ANI number is selected that indicates to the emergency operator that such information is available. In some instances, different ANI numbers can be associated with different providers. The PSAP system can automatically provide a link to the proper provider based upon the received ANI number. Should the emergency operator wish to review the additional information, he/she need only select the provided link.

Figure 5:
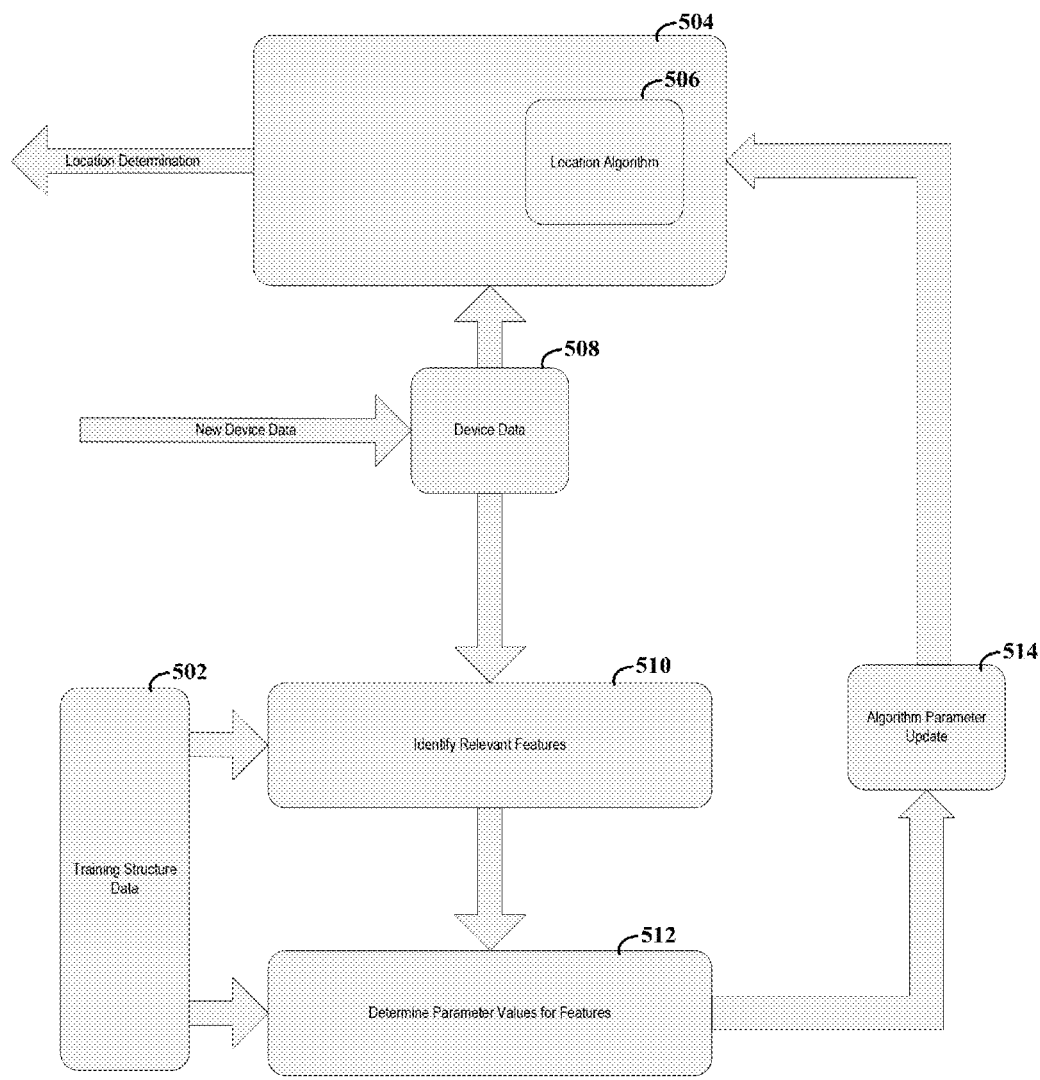
FIG. 5 depicts a diagram for determining and using a location algorithm, consistent with another example embodiment of the present invention.

FIG. 5 depicts a diagram for determining and using a location algorithm, consistent with an embodiment of the present invention. In certain embodiments, the location determination server 116 is designed to dynamically update the algorithm used to determine a probable location for an endpoint device and/or associated nodes. While a variety of different learning algorithms can be used for such updating, FIG. 5 depicts a block diagram for a particular implementation.

Endpoint devices, such as GS, PA or emergency devices, can provide device data 508 that is useful for determining a location thereof. This device data 508 can include a variety of different parameters. A particularly useful implementation allows the system to dynamically select which parameters are most relevant and to make location determinations. To accommodate the large number of potential parameters, it may not be desirable or even feasible to have each endpoint device transmit all possible parameters. Instead, the number of parameters can be limited using a variety of mechanisms. In one implementation, a PA or GS device will transmit only a subset of all available parameters. The subset can be (among other things) randomly selected, weighted selection or selected based upon input parameters, such as the type of access node to which the device is currently connected. The parameters sent can also be different for a populating-type transmission relative to an emergency transmission. For instance, an emergency transmission may automatically select the most relevant parameters in order to determine the location with a high probability.

An embodiment of the present invention uses training data 502 as a basis for categorizing received data. When new device data is received 508, a location module 504 can use the current location algorithm 506 to determine a probable location for the endpoint device. Received device data 508 can also be used to update algorithms and/or parameters used therein.

An aspect of updating the algorithm involves identification of relevant features 510 and the proper parameter values for the features 512. From this information a parameter update 514 can be used to update the location algorithm.

Example learning algorithms that can be adapted for such use include, but are not limited to, supervised and unsupervised learning, Bayesian networks and neural networks.

Figure 6:
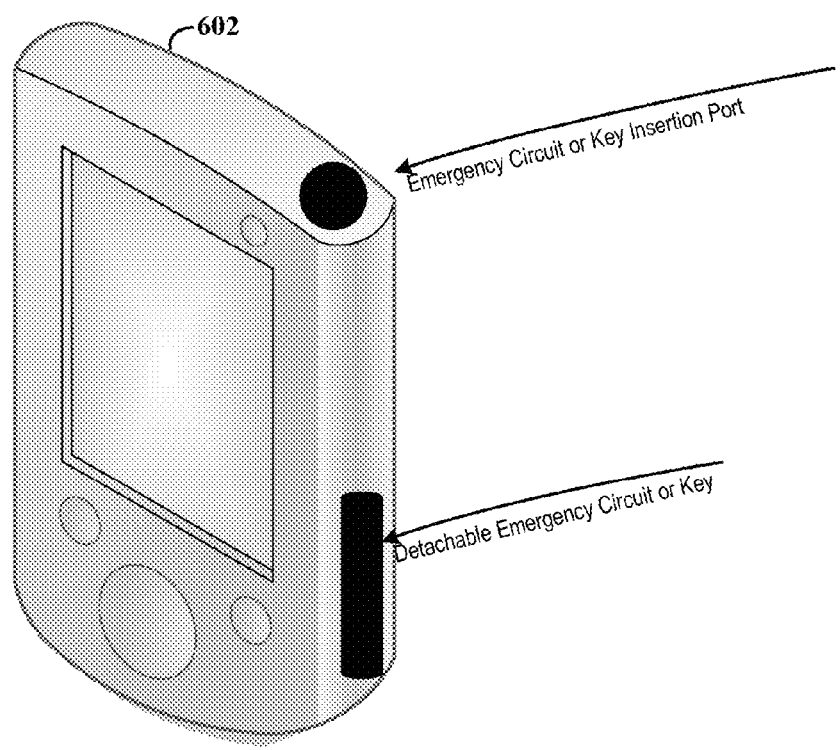
FIG. 6 depicts an Internet-enabled device with an emergency circuit, consistent with an embodiment of the present invention.

FIG. 6 depicts an Internet-enabled device with an emergency circuit, consistent with an embodiment of the present invention. A number of devices provide some level of access to the Internet despite not being used for voice communications. Currently, many of these devices do not provide access to emergency services. Since many of these devices also do not include location determination sources like GPS, the conventional wisdom suggests that they are ill-suited for such use. Aspects of the present invention however, recognize that intelligent determination algorithms for location information can be used in combination with such devices to provide access to emergency services.

A particular implementation is depicted in FIG. 6 in which an Internet capable device 602 is configured to allow access to emergency services. In some instances, the device may have limited input capabilities. For instance, some electronic book-reading devices have wireless access ports, but do not necessarily have sophisticated user interfaces (e.g., microphones, keyboards or the like). Thus, the traditional uses thereof are not particularly well-suited for use with emergency services.

Accordingly, such devices can be configured with a detachable emergency circuit that, when removed and/or inserted back into the device, contacts emergency services. The location determination server 116 receives a communication from the device and determines a probable location using information such as the connecting nodes, the device type and/or information about the registered owner of the device.

The activation can present the user with a series of predefined options for indicating the nature of the emergency. If the device is capable, the location determination server 116 can prompt the user to confirm the determined location.

In one embodiment an endpoint device includes an emergency circuit that is activated to initiate a connection with emergency services. This can be accomplished through the use of an external switch, card or other hardware component. When a user is in an emergency situation, they can activate the emergency circuit. In response to such activation, the endpoint device contacts the emergency service or PSAP using a network interface. Since the endpoint device may not have bidirectional (or even unidirectional) audio capabilities, the endpoint device can communicate with the emergency service using text or other means.

As an example, an electronic (book) reading device (e.g., a Kindle-type device) can include an emergency circuit and a network interface for downloading new books. The emergency circuit can be activated to allow the electronic reading device to connect to an emergency operator. The emergency operator can send text information to a user and the reading device can display the text for the user. If the reading device has the capability, the user can also send information back to the emergency operator.

The particular manner in which text-based communications are implemented can depend upon the PSAP capabilities. For legacy PSAPs that function primarily using voice calls, an interface device, such as a computer processor with modem capabilities, can interface with the endpoint device over standard telephone lines. For such an implementation, the activation of the emergency circuit can include activation of a modem-type circuit that facilitates communications with the PSAP interface devices. Other options allow the endpoint device to connect to a web-accessible (Internet) server, cellular SMS/MMS interface or the like. The information can then be forwarded to a PSAP emergency operator.

In a particular embodiment of the present invention, the emergency circuit is activated by insertion of an electronic key into an emergency port of the device. The electronic key can be stored in a sealed portion of the device to prevent inadvertent emergency connections to be initiated.

In certain embodiments, all or part of the emergency circuit can be implemented using a specially programmed processor.

FIG. 7 depicts a system for calculating and assigning incentives for providing populating data, consistent with an embodiment of the present invention. PA, GS or other devices provide populating data to a location determination server for storage in a location database. The location determination server can be configured to communicate with other devices or servers to credit/incentivize users that provide populating data. A few, non-limiting examples of devices or servers that might receive and provide incentives include social websites, VoIP providers and government websites (e.g., providing incentive to assist emergency services).

The amount of the credit/incentive can be calculated as a function of the usefulness of the information provided. For instance, table 702 shows that a correlation can be established between various locations, access points and/or transmission nodes, and the confidence level of the location thereof. From this correlation a reward value can be assigned for users that provide populating data. This reward value can then be associated and credited to an appropriate user account as shown by table 704. A user can then use the accumulated reward value to receive some benefit and/or be shown their respective rank relative to other users. Other factors that can be used to calculate the reward value include the accuracy and usefulness of the information. For instance, an active/current GPS-based location can provide a high level of accuracy and a user can be credited appropriately. Similarly, extra reward points can be credited if the user manually confirms the location information.

The accumulation of reward points and the corresponding benefits to a user can be implemented by a variety of different parties. In one implementation, the operator of the information database can accumulate the reward points and also provide associated benefits. This is particularly useful where the operator of the information database also provides other services that users can benefit from. For instance, the operator might provide VoIP services and provide users with discounts or free minutes. In another implementation, a third party can handle the accumulation of the reward points and the distribution of associated benefits or services. Combinations of these implementations are also possible.

In certain embodiments, a service or website can prompt users to submit populating data. For instance, a user might access a social website using an endpoint device connected to a particular access node. The social website can prompt the user to provide populating information. This prompting can be implemented in a wholesale, random or targeted manner. For instance, the prompting could be offered to all users, random sets of users or to specific users. The targeted prompting considers factors such as the type of endpoint device being used as well as the use of an endpoint location for which populating data is desired.

These and other aspects of the present invention can be implemented in a number of different manners including, but not limited to, stored executable data on tangible medium, computer processors, programmable logic, hardware circuit logic and combinations thereof. Aspects of the present invention can be implemented using general purpose computers that have been specially configured with instructions stored on a tangible medium. Various functions described herein are thereby able to be carried out by modifying one or more general purpose computers to function as specially-programmed computers. It is also possible that various functions can be implemented through the design of electronic hardware logic devices. Accordingly, there is flexibility that allows for a device to use stored instructions, specially programmed logic circuits, discrete logic, programmable logic devices and combinations thereof.

The various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. For example, the methods, devices and systems discussed herein may be implemented in connection with voice-over Internet services, streaming media and call-processing. The invention may also be implemented using a variety of approaches such as those involving a number of different operating systems and software programs/packages. Such modifications and changes do not depart from the true spirit and scope of the present invention, including that set forth in the following claims.

What is claimed is:

1. An apparatus for use with a plurality of endpoint devices, each endpoint device being configured and arranged to provide physical location data about the physical location of the endpoint device to an external network, the apparatus comprising:
   a wireless communication circuit configured and arranged to receive over one or more wireless communication channels, venue information that characterizes physical location data corresponding to at least two network access points for each of the plurality of endpoint devices; and
   a server configured and arranged with a memory circuit to respond to the wireless communication circuit by
      receiving the venue information from one of the plurality of the endpoint devices;
      calculating respective physical locations for one or more nodes in a transmission route between said one of the plurality of the endpoint devices and the server, as a function of the venue information and the transmission route;
      storing the calculated respective physical locations corresponding to the one or more nodes in a transmission route; and
      in response to an emergency call from a Voice over Internet Protocol (VoIP) device:
         identifying one or more nodes in a transmission route used to send data from the VoIP device;
         retrieving the stored physical locations for the identified nodes; and
         providing a probable physical location for the VoIP device to an emergency operator based on the stored locations for the identified nodes and a probable location algorithm that is configured and arranged to: assign respective weightings to the calculated physical locations of a plurality of the nodes based on a degree of certainty of the location data, the location data of the endpoint device having a greater certainty than other end point devices indicated by the probable location algorithm.

2. The apparatus of claim 1, further including the plurality of endpoint devices.

3. The apparatus of claim 2, wherein each of the endpoint devices is a wireless handheld device including a display.

4. The apparatus of claim 1, wherein the server is further configured and arranged to use physical location data obtained from the endpoint device as a training dataset for a learning algorithm that defines the probable location algorithm.

5. The apparatus of claim 1, wherein a processing circuit in the endpoint device is further configured to provide feedback to users of the endpoint device in the form of a system linked to a social networking application.

6. The apparatus of claim 1, wherein the server is further configured to update a current calculated physical location for the one or more of the identified nodes in the transmission route based upon receipt of additional populating data.

7. The apparatus of claim 1, wherein a calculated physical location for one of the identified nodes in the transmission route is a geographic area determined as a function of the probability that an endpoint device connected to one of the identified nodes in the transmission route is within the geographic area.

8. The apparatus of claim 1, further including the plurality of endpoint devices, wherein each of the endpoint devices is a wireless handheld device including a display.

9. The apparatus of claim 1, further including the plurality of endpoint devices, wherein each of the endpoint devices is a wireless handheld device including a display, and wherein each endpoint device is configured and arranged to transmit a data packet to at least two network access points.

10. The apparatus of claim 1, further including the plurality of endpoint devices, wherein each of the endpoint devices is a wireless handheld device including a display, and wherein each endpoint device is configured and arranged to transmit a data packet to at least two network access points, the data packet including
   a unique identifier of the endpoint device, and
   a request for the network access point receiving the request to send a data transmission that includes the unique identifier to the location determination server that is remote from the network access point, and for the network access point to add a respective identifier of the access point to the data transmission.

11. The apparatus of claim 1, further including the plurality of endpoint devices, wherein each of the endpoint devices is a wireless handheld device including a display, and wherein each endpoint device is configured and arranged to
   transmit a data packet to at least two network access points, and
   subsequent to transmission of the data packet, transmit the one or more populating data packets to the location-determination server with information correlating the physical location data in the one or more populating data packets with the unique identifier of the endpoint device.

12. The apparatus of claim 1, further including the plurality of endpoint devices, wherein each of the endpoint devices is a wireless handheld device including a display, and wherein each endpoint device is configured and arranged to
   transmit a data packet to at least two network access points without establishing a bidirectional communication with the at least two network access points, the data packet including
      a unique identifier of the endpoint device; and
      a request for the network access point receiving the request to send a data transmission that includes the unique identifier to the location determination server that is remote from the network access point, and for the network access point to add a respective identifier of the access point to the data transmission; and
   subsequent to transmission of the data packet, transmit the one or more populating data packets to the location-determination server with information correlating the physical location data in the one or more populating data packets with the unique identifier of the endpoint device.

13. An apparatus for use with a plurality of endpoint devices, each endpoint device being configured and arranged to provide physical location data about the physical location of the endpoint device to an external network, the apparatus comprising:
   a wireless communication circuit configured and arranged to receive over one or more wireless communication channels, venue information that characterizes physical location data corresponding to at least two network access points for each of the plurality of endpoint devices; and
   server means for responding to the wireless communication circuit for
      receiving the venue information from one of the plurality of the endpoint devices;

calculating respective physical locations for one or more nodes in a transmission route between said one of the plurality of the endpoint devices and the server, as a function of the venue information and the transmission route;

storing the calculated respective physical locations corresponding to the one or more nodes in a transmission route; and in response to an emergency call from a Voice over Internet Protocol (VoIP) device:

identifying one or more nodes in a transmission route used to send data from the VoIP device;

retrieving the stored physical locations for the identified nodes; and providing a probable physical location for the VoIP device to an emergency operator based on the stored locations for the identified nodes and a probable location algorithm that is configured and arranged to: assign respective weightings to the calculated physical locations of a plurality of the nodes based on a degree of certainty of the location data, the location data of the endpoint device having a greater certainty than other end point devices indicated by the probable location algorithm.

14. For use with a plurality of endpoint devices, each endpoint device being configured and arranged to provide physical location data about the physical location of the endpoint device to an external network, a method comprising:

receiving over one or more wireless communication channels, venue information that characterizes physical location data corresponding to at least two network access points for each of the plurality of endpoint devices; and responding to the wireless communication circuit by receiving the venue information from one of the plurality of the endpoint devices;

calculating respective physical locations for one or more nodes in a transmission route between said one of the plurality of the endpoint devices and the server, as a function of the venue information and the transmission route;

storing the calculated respective physical locations corresponding to the one or more nodes in a transmission route; and in response to an emergency call from a Voice over Internet Protocol (VoIP) device:

identifying one or more nodes in a transmission route used to send data from the VoIP device;

retrieving the stored physical locations for the identified nodes; and providing a probable physical location for the VoIP device to an emergency operator based on the stored locations for the identified nodes and a probable location algorithm that is configured and arranged to: assign respective weightings to the calculated physical locations of a plurality of the nodes based on a degree of certainty of the location data, the location data of the endpoint device having a greater certainty than other end point devices indicated by the probable location algorithm.

\* \* \* \* \*